Figure 1:
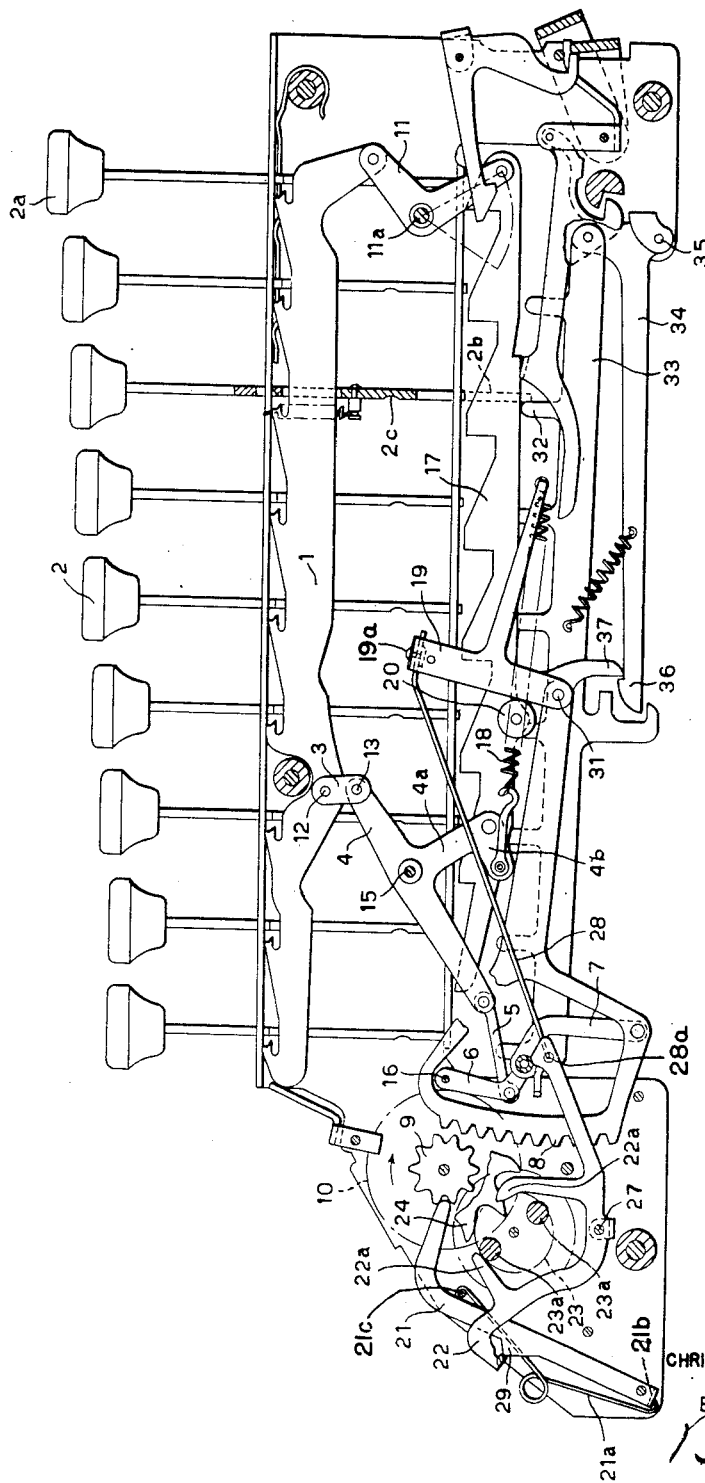

Dec. 15, 1953     C. F. WEBB     2,662,690

NUMERAL WHEEL LOCKING MECHANISM

Original Filed Nov. 22, 1948     2 Sheets-Sheet 1

INVENTOR.
CHRISTOPHER FREDERICK WEBB
BY Busser & Harding

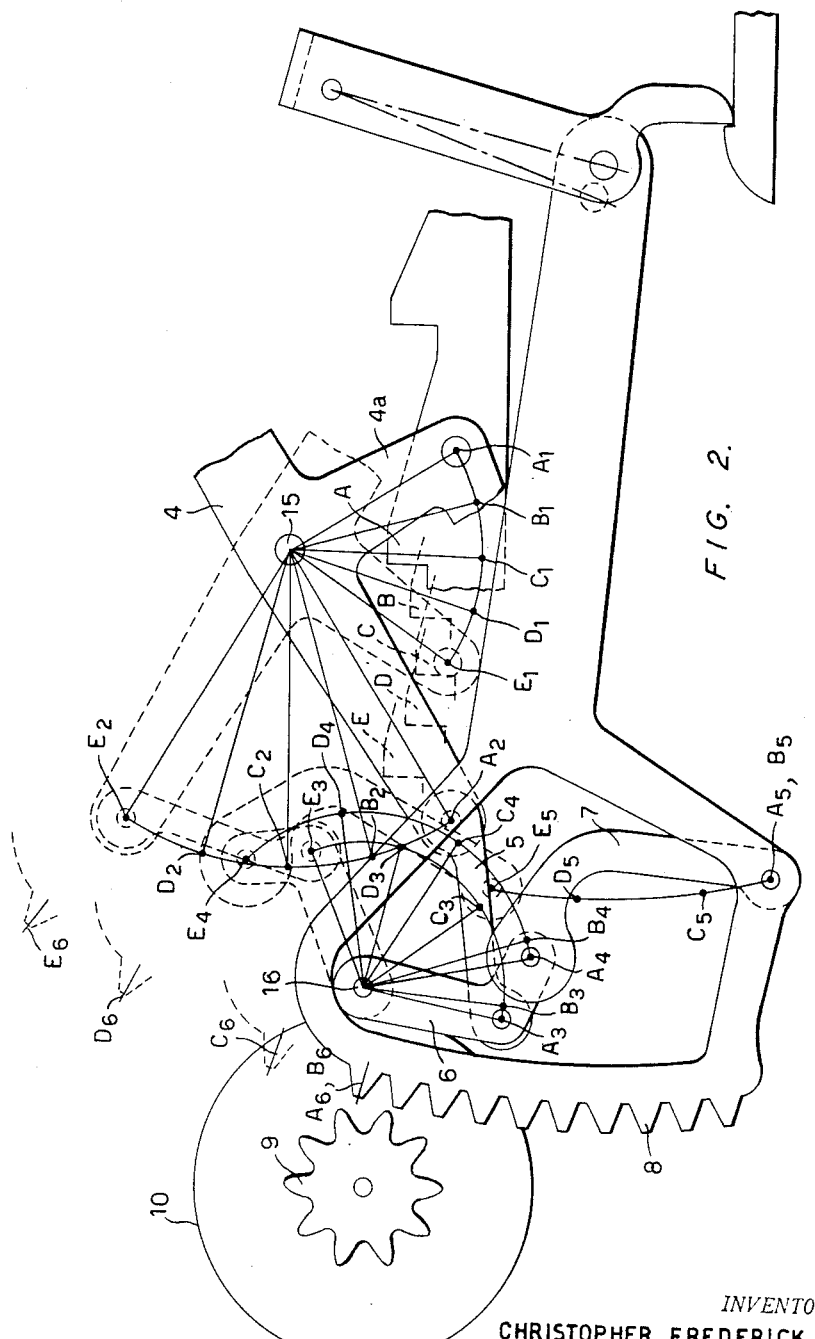

Patented Dec. 15, 1953

2,662,690

UNITED STATES PATENT OFFICE 2,662,690

NUMERAL WHEEL LOCKING MECHANISM

Christopher Frederick Webb, London, England, assignor to Bell Punch Company Limited, London, England, a British company Original application November 22, 1948, Serial No. 61,348. Divided and this application February 25, 1950, Serial No. 146,186

Claims priority, application Great Britain December 2, 1947

3 Claims. (Cl. 235—82)

This invention relates to calculating machines and has particular reference to the type of calculating machine in which the driving rack is normally out of engagement with the registering wheels, for example the type of machine disclosed in my United States Patents No. 2,291,853, dated August 4, 1942, and No. 2,356,714, dated August 22, 1944, and in my British Patent No. 522,721, accepted June 25, 1940.

In the type of machine just indicated there is provided a calculating machine in which the movement of a key is transmitted through a chain of links to a rack movable to transmit motion to a pinion operatively connected to a numeral wheel, one of the links of the said chain of links being connected to the rack so that any movement of the said link relatively to the rack is solely of a pivotal nature, and being operable through the remaining links of the chain to impart to the said rack, when moving toward or away from its initial position of rest, a relatively slow motion. In brief, the chain of links insures that as the quadrant rack moves from its position of rest it gradually increases its velocity and, when making its return stroke, moves back to its position of rest gradually. In their final movement both the quadrant rack and the pinion connected to the numeral wheel are brought to rest before the links of the chain have ceased moving. This arrangement insures that upon the return of the quadrant rack to its initial position any sudden jar is completely eliminated.

The improvement provided in accordance with the present invention relates to the provision of means whereby the numeral wheels are normally locked against rotation and which, when they are about to be set in motion as the result of actuation of a key, are automatically released from said lock.

Hitherto in calculating machines of the character indicated, a pinion wheel associated with the numeral wheel is arranged to engage with a yieldingly controlled pawl which, when the pinion is set in motion as the result of actuation of a key, yields against the motion of the pinion so as to permit the same to rotate. It will be appreciated that in such circumstances the pinion is not positively locked against rotation, but is merely held in a predetermined position by a yieldingly controlled pawl engaging with the pinion between two of its teeth, but in such fashion that when the numeral wheel is moved the pawl will yield to such movement. With a yieldingly controlled pawl it is necessary to have a driving spring for the pinion of the numeral wheel much stronger than would be the case if the numeral wheel was not controlled by a yieldingly controlled pawl. According to the present invention, since the pressure on the pinion is relieved, a lighter driving spring is required and, consequently, the operator need not exert such high pressures upon the keys as when a yieldingly controlled pawl is used.

In accordance with the present invention there is associated with each pinion means normally locking the same positively against rotation and which, when a pinion is about to be set in motion as the result of the actuation of a key, automatically releases the pinion. Thus the friction inherent in any type of yieldingly controlled pawl is completely eliminated enabling a lighter touch of key operation to be employed.

The objects of the present invention relate to the attainment of the ends above indicated. These general objects as well as objects relating to details of construction and operation will become apparent from the following description read in conjunction with the accompanying drawings, in which:

Figure 1 illustrates in vertical section the devices associated with one bank of keys of a machine of the type described; and Figure 2 is a diagram particularly illustrating the actuation of the rack controlling linkage above referred to.

As will be evident from reference to the prior patents mentioned above, the machine is of the general type disclosed therein and there are not herein detailed those elements of the complete machine which are known to the art through the disclosure of said patents, the disclosure being confined to those devices which include the improvements embodying the present inventions.

The bank of keys 2 illustrated in Figure 1 have associated with them a key bar 1, the movement of which is transmitted through a chain of links 3, 4, 5, 6 and 7 to a quadrant rack 8 movable to transmit motion in degree related to the operated key to drive a pinion 9 connected to a numeral wheel 10. The link 7, of the said chain of links, is connected to the quadrant rack 8 so that any relative movement between the quadrant rack 8 and the link 7 is solely of a pivotal nature. The link 7 is operable through the remaining links of the chain to impart to the quadrant rack 8 a velocity which increases from zero. The return movement of the quadrant rack 8 to its position of rest is also effected gradually thus insuring that the quadrant rack 8 is provided, both at the commencement of its movement and at the end thereof, with a relatively slow motion which reduces the inertia of the quadrant rack and the numeral wheel 9 to a minimum and assures the smooth and gradual arrest thereof.

When a key 2 is depressed an abutment thereon engages with the key bar 1 to move the same downwardly. The key bar 1 is connected at substantially the ends thereof to a bell crank lever 11 pivoted at 11a on a fixed transverse pin and to a link 4 which is shaped as a bell crank lever. The construction is such that as a key is moved downwardly the key bar moves downwardly and inwardly as described in said patents. As the key bar 1 moves downwardly it imparts through the pins of links 3 to 7, inclusive, to the quadrant rack 8 a motion which will be more specifically set out in describing Figure 2. It will be observed that the link 3 is pivotally connected to both the key bar 1 and the link 4 by pivot pins 12 and 13. The link 4 is pivotally mounted upon a fixed pin 15 which extends the entire breadth of the machine, and is common to the various key orders thereof. The end of the link 4, remote from that which is connected to the link 3, is pivotally connected to the link 5 which in turn is pivotally connected to a point intermediate the length of the link 6 which is shaped as a bell crank lever. The upper end of the link 6 is pivoted upon fixed spindle 16 which extends through the entire breadth of the machine. The lower end of the link 6 is pivotally connected to the link 7 which in turn is connected through a pivot pin to the quadrant rack 8 so that the only movement of the link 7 relatively to the quadrant rack 8 is a pivotal movement, thereby avoiding any sliding movement of the pivot in a cam groove as disclosed in Patent No. 2,356,714.

Referring specifically to Figure 2, there is diagrammatically illustrated the operation of the chain of links as the key 2a carrying the numeral 9 is depressed to move the quadrant rack 8 from its position of rest through its complete movement of nine teeth. An arm 4a of the link 4 is shown pivotally connected at A₁ to a selector bar 17. As the key 2a of the series of keys 2 is operated it moves, through the medium of the bell crank levers 11 and 4, with selector bar 17 through the positions marked A, B, C, D and E. As the selector bar is moved through these positions the pivot pin of the arm 4a moves through the positions A₁, B₁, C₁, D₁, and E₁ and the free end of the link 4, shown as pivotally connected at A₂ to the link 5 moves through the positions A₂, B₂, C₂, D₂ and E₂ while the end of the link 5 which is shown as pivotally connected at A₃ to the link 6 moves through the positions A₃, B₃, C₃, D₃ and E₃. The movable end of the link 6 is pivotally connected at A₄ to the link 7 and moves through the positions A₄, B₄, C₄, D₄ and E₄ while the link 7 which is pivotally connected at A₅ to the quadrant rack 8 does not move at all during the initial movement of the other links from their "A" to their "B" positions, after which the end of the link 7 which is pivotally connected to the quadrant rack 8 takes up the successive positions C₅, D₅ and E₅. The initial positions A₅ and B₅ are coincident. As the link 7 moves so that the quadrant rack 8 is moved the successive positions of the first tooth are those indicated at A₆, B₆, C₆, D₆ and E₆, A₆ and B₆ being coincident.

It will be observed that during the operation of the machine the upward movement of the rack may be arrested by the appropriate key at any tooth position from one to nine, this being controlled by the co-operation of key stems with the bars 1 and 17, as disclosed in said prior patents. At any of such positions the connection of the link 7 with the link 6 becomes temporarily a stationary point about which the link 7 can swing to permit the quadrant rack 8, when released, to move into mesh with its pinion 9. It should further be noted that at any one of the said nine positions the link 7 will insure that the tooth engagement of the quadrant rack 8 with the pinion 9 is in a substantially radial direction relatively to the pinion 9.

It will be observed from the above that upon the initial movement of the key the operator merely sets the chain of links which is to operate the quadrant rack 8 into motion, without effecting any movement of the rack 8 itself, after which the quadrant rack 8 is moved to an accelerated degree. Referring to Figure 1 it will be observed that the main spring 18 is anchored to a lateral extension 4b of the link 4, the arrangement being such that shortly after the movement of the link has commenced the anchorage point of the extension 4b of the link 4 rises so as to cause the effective leverage of the tension spring 18 about the pivot 15 to diminish as the tension of the spring 18 increases. The arrangement of the link 4 and extension 4b thereof is designed to produce a substantially constant resistance to the pressure of the operator's finger throughout an operating stroke. As the connection between the link 7 and the quadrant rack 8 is of a purely pivotal character, friction is minimized as contrasted with that involved in a sliding pin and slot.

Upon the completion of a key stroke the quadrant rack 8 is released by the trip mechanism as hereinafter described and is moved under the influence of the driving spring 18 into engagement with the pinion 9, this being effected through the pivotal connection of the rack to the lever 19 to which the rear end of the spring is secured. As the quadrant rack returns to its position of rest under the influence of the spring 18 and therefore returns the pinion 9 and the numeral wheel 10 to their positions of rest it arrives at such a position of rest before the chain of links forming the operative connection between the quadrant rack and the key bar have ceased moving. Consequently, it is insured that the numeral wheel 10 and its pinion 9 are stationary before the mechanism effecting the withdrawal of the rack from the pinion 9 is brought into operation.

Associated with each pinion 9 there is a pawl 21 and locking lever 22. This arrangement normally locks the pinion 9 against rotation, and an arrangement is provided which, when a pinion 9 of a bank of keys is about to be set in motion as the result of actuation of a key, automatically releases the pinion. The pinions 9 are released either when the rack 8 positively moves the pinion or when a transfer mechanism 23 rotates through the medium of pins 23a a toothed wheel 24 connected to the pinion 9. This transfer mechanism is disclosed in Patent No. 2,291,853, and need not be described in detail except to the extent of reference to the pins 23a.

First, dealing with the instance where the pinion 9 is moved by the rack 8 it will be evident that when the trip mechanism described hereafter releases the rack 8 the lever 22 is moved in a counterclockwise direction about its pivot 27 by the flexing of a spring 28 connected between it and the lever 19. One end of the leaf spring 28 is attached to a horizontally extending portion of the upper end of the lever 19 by means of a nut and bolt arrangement 19a. The other end of the leaf spring 28 is provided with a forwardly turned portion 28a which passes through a bore in the right hand end of the lever 22 as viewed in Figure 1. By this flexing action the lever 22 is moved downwardly and out of engagement with the locking surface 29 with which it normally engages. The pawl 21 released from its positive locking engagement with the pinion 9 permits the numeral wheel to be freely rotated. Due to the fact that the pawl 21 is not of a yieldingly controlled type which snaps into and out of engagement with the tooth of the pinion 9 the operation of the numeral wheel is rendered less noisy than in the case of a pinion wheel which is restrained by a yieldingly controlled pawl.

When a numeral wheel of a lower order is transferring to a numeral wheel of a higher order the pins 23a are arranged to engage with the right hand lateral extension 22a of the locking lever 22 to swing the same in a clockwise direction about its pivot 27 so as to move the locking lever out of engagement with the locking surface of the pawl 21. After the transfer action has taken place the pawl again becomes locked in the position indicated, this being insured by contact of pin 23a with the left hand extension 22a of the locking lever.

It has been shown that the numeral pinions are always positively locked except when an adding or transferring operation is in progress, but it will be appreciated that it is also necessary to remove any obstruction from the path of the pinions during a cancelling operation in order to permit the numeral wheels to be returned to zero. For this purpose there may be provided means for displacing by manual operation of a cancel lever all of the pawls 21 in the axial direction of the pinions 9 so that the pawls 21 are temporarily moved out of the path of the pinions 9 without in any way interfering with the locking functions already described. A spring 21a has one end engaged in a bore in a horizontally extending portion 21b of the lower end of the pawl 21 and its other end in engagement with a fixed transverse pin 21c. The spring 21a is arranged to exert a slight torque on the pawl 21 in an axial direction to return the tip of the pawl into the plane of the pinion following a cancelling operation.

It will be seen that according to the present invention there is provided a calculating machine in which the pinions of the numeral wheels are normally locked positively against rotation, and wherein the arrangement is such that when the pinion wheels are about to be set in motion the positive lock is released and the pinion wheels are free to be rotated eliminating all friction and enabling a lighter key touch to be employed in view of the fact that the driving spring 18 need not be as strong as would be the case if a yieldingly controlled pawl was employed.

After the rack 8 has moved free of the pinion to the degree determined by the key which has been operated, it must be permitted to engage the pinion and this action is effected upon full depression of the key. The lower end of a key stem, when it reaches the position indicated in dotted lines at 2b, is adjacent one of the projecting lugs 32 formed on a trip bar 33. When the key stem reaches the dotted position a tooth of the bar 17 will have reached the face of the key at 2b and at the same time, a groove 2c formed in the opposite face of the key will be coincident with the lower guide through which the key passes. When the moving bar 17 touches the key the latter is therefore displaced horizontally a small amount, whereby the lug 32 and the trip bar 33 are moved from right to left as viewed in Figure 1. This movement of the trip bar 33 swings catch lever 34 pivotally mounted at 35 about this mount so as to move the end 36 thereof out of engagement with a tongue 37 carried by the lever 19 which at pivot point 31 is connected to the rack 8. When the catch lever 34 is released from the tongue 37 the spring 18 urges the rack in a direction toward the pinion 9 of the numeral wheel 10.

It will be noted that the lever 19 is released by the roller 26 on the bar 17 when a key is depressed, and that this same roller effects disengagement of the rack 8 from the pinion 9 by its action on the lever 19 when a key is released to its uppermost position. When the lever 19 has been released by the roller 26, the line of thrust of the spring 28 connecting the upper end of the lever 19 with the right-hand end of the lever 22, as viewed in Figure 1, is such as to urge the lever 22 to rotate in a clockwise direction about the pivot 27. This rotation is resisted by engagement of the extension 22a with the pin 23a. It is not until the end 36 of the latch lever releases the tongue 37 and permits the spring 18 to urge the lower end of the lever 19 to the right, as viewed in Figure 1, that the flexing of the spring 28 rotates lever 22 counterclockwise about its pivot 27 and releases the pawl 21.

Thus it will be seen that the movement of the bar 17 of the mechanism, in response to the depression of a key, causes the release of catch 36 without direct vertical contact of the end of the key stem as formerly required, and in ordinary operation the trip is effected by the momentum of the mechanism without direct influence from the key. Such an arrangement practically eliminates that harshness introduced by the dead end stroke operation inherent in the arrangement described in said British Patent No. 522,721.

This is a division of my application Serial No. 61,348, filed November 22, 1948, now Patent No. 2,569,508, and contains subject-matter common with my divisional application, Serial No. 146,187, filed February 25, 1950.

What is claimed is:

1. In a calculating machine of the type referred to having a plurality of orders, each order including a plurality of keys, a numeral wheel, a pinion connected to said numeral wheel, means through which actuations of said keys produce variable movements of said numeral wheel, means for effecting transfer movements from the numeral wheel of one order to a numeral wheel of next higher order, and means normally positively locking said numeral wheel against rotation, said last mentioned means including a pawl normally held in non-yielding engagement with said pinion, a locking surface formed on said pawl and a catch in engagement with said locking surface preventing movement of said pawl, said catch comprising a pivoted lever normally arranged in engagement with said locking surface formed on the pawl and movable in one direction about its pivot and out of engagement with the locking surface on the pawl by the movement of said first mentioned means and movable in another direction about its pivot and out of engagement with the locking surface on the pawl by the operation of the transfer means.

2. In a calculating machine of the type referred to having a plurality of keys, a numeral wheel rotatably mounted on a fixed axis, a pinion connected to said numeral wheel, means including a rack gear through which actuations of said keys produce variable movements of said numeral wheel, said rack gear being normally disengaged from said pinion and being in engagement therewith during periods of movement of said pinion, and means normally positively locking said numeral wheel against rotation, the last mentioned means including a pawl normally held in non-yielding engagement with said pinion, a locking surface formed on said pawl and a catch in engagement with said locking surface preventing movement of said pawl, said catch comprising a pivoted lever, said first mentioned means including means for moving said pivoted lever about its pivot to release said pawl during periods of engagement of said rack gear with said pinion.

3. In a calculating machine of the type referred to having a plurality of orders, each order including a plurality of keys, a numeral wheel, a pinion connected to said numeral wheel, means through which actuations of said keys produce variable movements of said numeral wheel, means for effecting transfer movements from the numeral of one order to a numeral wheel of next higher order, and means normally positively locking said numeral wheel against rotation, said last mentioned means including a pawl normally held in non-yielding engagement with said pinion, a locking surface on said pawl and a catch in engagement with said pawl preventing movement of said pawl, said catch comprising a pivoted lever normally positioned to have a portion thereof in engagement with said locking surface formed on the pawl, said pivoted lever including a pair of arms extending from the pivoted lever on either side of its pivot, the pivoted lever being movable in one direction about its pivot and out of engagement with said pawl by the movement of said first mentioned means, and means including said pair of arms for moving said pivoted lever in the opposite direction about its pivot and out of engagement with said pawl by operation of the transfer means and for moving said pivoted lever in said one direction about its pivot and into engagement with said pawl by continued operation of the transfer means.

CHRISTOPHER FREDERICK WEBB.

References Cited in the file of this patent

UNITED STATES PATENTS

| Number | Name | Date |
|---|---|---|
| 371,496 | Felt | Oct. 11, 1887 |
| 1,510,951 | Morse | Oct. 7, 1924 |
| 2,308,940 | Sundstrand | Jan. 19, 1943 |